May 23, 1972  L. SCHWEIGERT ET AL  3,664,592
MACHINE FOR GRANULATING BULK RUBBISH OR BULKY REFUSE OF ANY KIND
Filed Sept. 3, 1969                         5 Sheets-Sheet 5

United States Patent Office 3,664,592
Patented May 23, 1972

3,664,592
MACHINE FOR GRANULATING BULK RUBBISH OR BULKY REFUSE OF ANY KIND
Luitpold Schweigert, Lieneschurez 34, Osnabruck, Germany, and Kurt Rossler, Ringstrasse 28, Belm-Osnabruck, Germany
Filed Sept. 3, 1969, Ser. No. 854,821
Claims priority, application Germany, Sept. 3, 1968, P 17 58 913.8
Int. Cl. B02c 18/14, 18/20
U.S. Cl. 241—73                                7 Claims

ABSTRACT OF THE DISCLOSURE

A machine for comminuting bulky refuse of any kind. The machine includes a pair of rotary shafts which are parallel to each other and which are adapted to rotate in opposite directions. Each shaft has distributed therealong a plurality of rotary cutters fixed to the shaft for rotation therewith with the rotary cutters being spaced from each other along the shaft and with each cutter having a single tooth, the teeth of the cutters distributed along each shaft being angularly staggered about the axis of each shaft. The cutters on one shaft are aligned with the spaces between the cutters on the other shaft, and each cutter has a circular portion fixed to the shaft and the single tooth of each cutter projects beyond the circular portion of each cutter. These circular portions of the cutters on the pair of shafts have peripheries situated closely adjacent to each other so that the single cutting teeth on the several cutters of one shaft move through the spaces between the circular portions of the cutters on the other shaft. The rotary shafts with the cutters thereon are housed within a trough-shaped housing carrying an upper inlet through which material is supplied to the cutters, this housing having a lower outlet situated beneath the rotary cutters at a location adjacent to the space through which the teeth of the cutters turn during rotation of the shafts. This lower outlet of the housing carries a structure which prevents the comminuted material from passing through the outlet until this material has been reduced to a given size, and the cutting teeth function not only to comminute the material but also to repeatedly raise it from the outlet and repeatedly act on the material until it has been reduced to the size required to pass through the outlet where a suitable collector can be provided to receive the comminuted material. The spaces on each shaft between the successive cutters distributed therealong accommodates a structure for cleaning comminuted material out of these spaces during rotation of the shafts and the cutters therewith.

Figure 1:
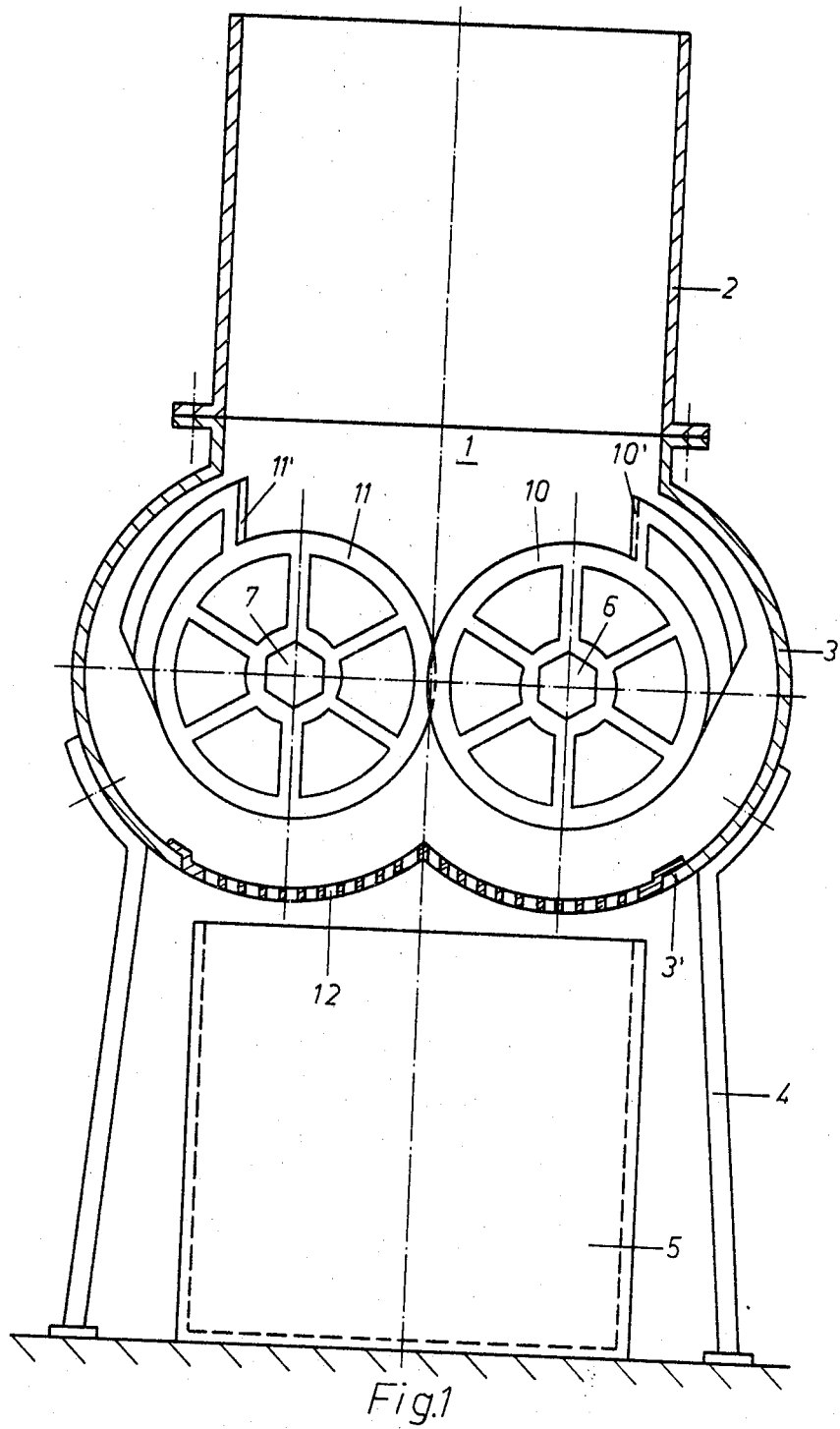

The object of the invention relates to a machine for granulating bulk rubbish or bulky refuse of any kind, such as containers, bottles or the like of metal, plastic, glass, wood or similar materials.

Machines and devices for crushing are known to form part of the state of the art generally.

In this connection, reference is made to so-called feed and ball mills. These feed and ball mills consist of a housing with a funnel on top of it, adjacent to which is a chamber in the shape of a trough. Disposed in the bottom areas of this chamber are two rollers with straight or oblique flutes, driven in opposing direction. The material, such as grain or the like, is squeezed between these fluted rollers and ground. The size of the material to be ground is governed by the axial distance between the grinding and squeezing rollers.

It is further known to cut records and used paper into strips like corrugated paper by means of machines, or to tear them into irregular pieces.

In these machines, the records are partly fed to the operating area of the rotary cutters by a mechanically driven feeding device. There exists the possibility to design the mouths of these mechanical feeding devices in the form of funnels. However, these feeding devices, generally consisting of revolving feed rollers or feed belts, mean a considerable increase in weight and also higher costs of this kind of record destroyers. Quite apart from this, it is not possible with this feeding device to cut up crumpled paper or pieces of cardboard, because such material is not off-hand engaged by the rotary knives, even if fed to them by a feeding device as described above.

Also known are record destroyers in which the rotary knives are superposed approximately vertically and the material to be cut up is fed to the working area of these rotary knives on an approximately horizontal table. As a rule, the rotary knives of such machines are covered on top by a hood or the like, whose mouth on the feeding side of the material forms a feeding funnel while a material discharge is provided at the same time on the discharge side. Such record destroyers are not suited for the comminution of crumpled paper and cardboard either.

Another machine for the comminution of railroad tickets, coupons or the like has become known, in which the rotary knives, forming the bottom of a trough to be filled, are juxtaposed horizontally. In this type machine, the disc knives are equipped with a V-shaped, peripheral groove, forming keen cutting edges at the lateral edges of the disc knife. In addition, triangular recesses are cut into these cutting edges. However, such machines are suited only for the comminution of small cardboard or paper pieces such as travel tickets, entrance tickets, telegram strips etc. But the knife design of this machine fails altogether when larger balls of crumpled paper are thrown into the feeder funnel.

In summary, in describing the state of the art it must be stated that while there are machines and devices for the comminution of materials made of paper, cardboard or the like, no practicable machines or devices for the comminution of bulk rubbish or bulky refuse are known. In this context, the emphasis is on practicable devices.

Now, the inventor has made it his business to create in this field, which is the granulation of bulk rubbish or bulky refuse of any kind, a device which appears suited to solve the rubbish problem decisively.

According to the invention, the problem posed is solved by a housing with a filler opening in the form of a hollow shaft and with an adjacent trough, at whose bottom are disposed two mutually spaced, parallel shafts driven in opposing direction which have mutually staggered, cooperating knife blades, each having a piercing-cutting tooth, and by the trough, located below the knife blades, having a closing-off, adjustable, replaceable screen or hollow discharge shaft.

Another characteristic of the invention is to be seen in that the shafts are equipped with any desired number of knife blades, the knife blades of each shaft being disposed with mutual spacing in accordance with the thickness of the opposite knife blade in such fashion that the piercing-cutting tooth always engages the free space between two knife blades.

The knife blade, possibly of solid design, displays a filleted front piercing-cutting tooth which goes over into a rear back tooth. Disposed between the various knife blades of the type described above is a spacer with a radially movable cleaning ring over it.

According to the invention, the spacer either has an external thread or it is smooth. The cleaning ring either has a smooth inside diameter or an internal thread.

The two parallel shafts running in opposing direction with their knife blades attached may be driven by an electric motor, with a speed reducer or the like interposed, and their respective circumferential speeds may be equal or unequal.

The piercing-cutting tooth of very strong design is disposed so as to be tangential to the knife blade, the cutting angle being between 45 and 80° and the rake angle between 45 and 90°, with a clearance angle of approximately 10°. Each of the knife blades, including its piercing-cutting tooth forming a unit with it, is of uniform width (thickness).

Furthermore, the object of the invention is characterized in that the knife blades have a flange-like extention with recesses, the thickness of the flange-like extension being somewhat greater than the width of the respective knife blade, a circular segment made of an elastic material such as rubber, plastic or the like, open in the area of the piercing-cutting tooth, being attachable to the extension.

The circular segment of elastic material has passage openings in the form of drilled holes or the like.

The knife blade with the tangentially disposed piercing-cutting tooth may consist of steel or a similar material, the cutting edge of the piercing-cutting tooth being hardened.

Another characteristic of the invention is to be seen in that the various knife blades with their respective tangentially disposed piercing-cutting tooth are so disposed on the respective shaft that the piercing-cutting teeth are uniformly staggered so as to be distributed equally relative to the circumference of the shaft, engaging uniformly with respect to the knife blade of the opposite shaft, the angle by which the various knife blades are staggered mutually on the shaft being 360° divided by the number of knife blades on the shaft.

It should be mentioned, finally, that the screen in the area of the trough bottom may be replaced by a discharge shaft with rods made of metal, plastic or the like material, disposed so as to extend downward and mutually spaced sideways and in columns, for accident prevention.

Figure 2:
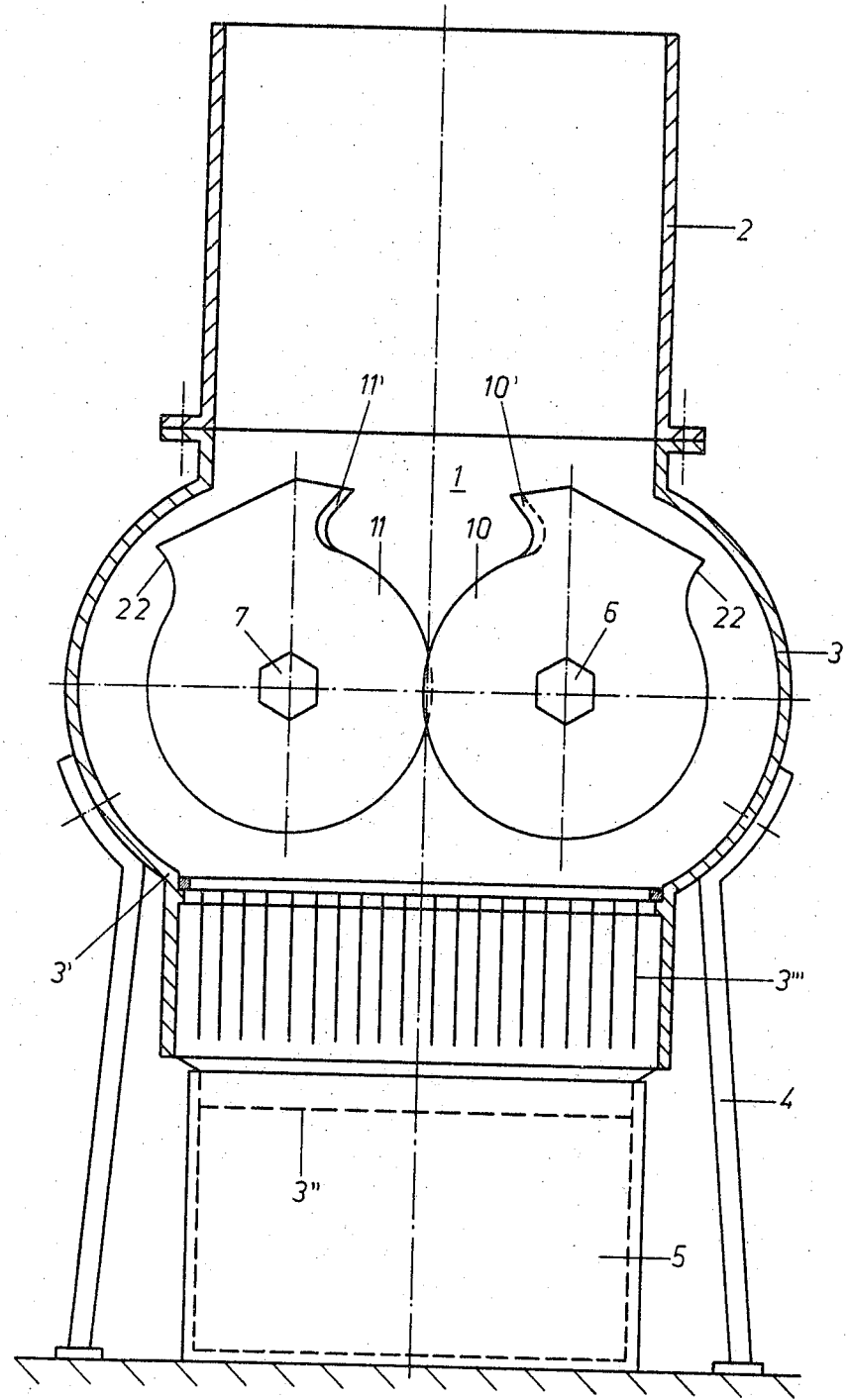
Figure 3:
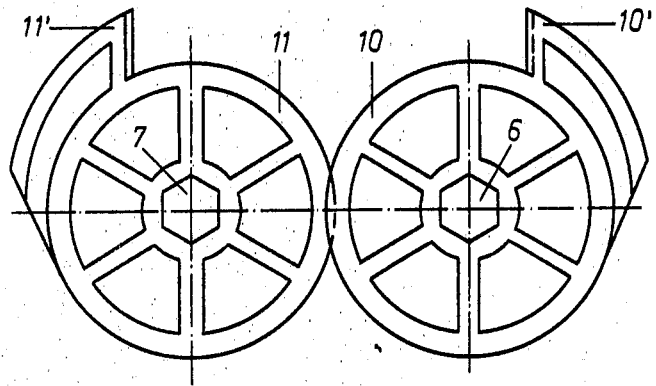
Figure 4:
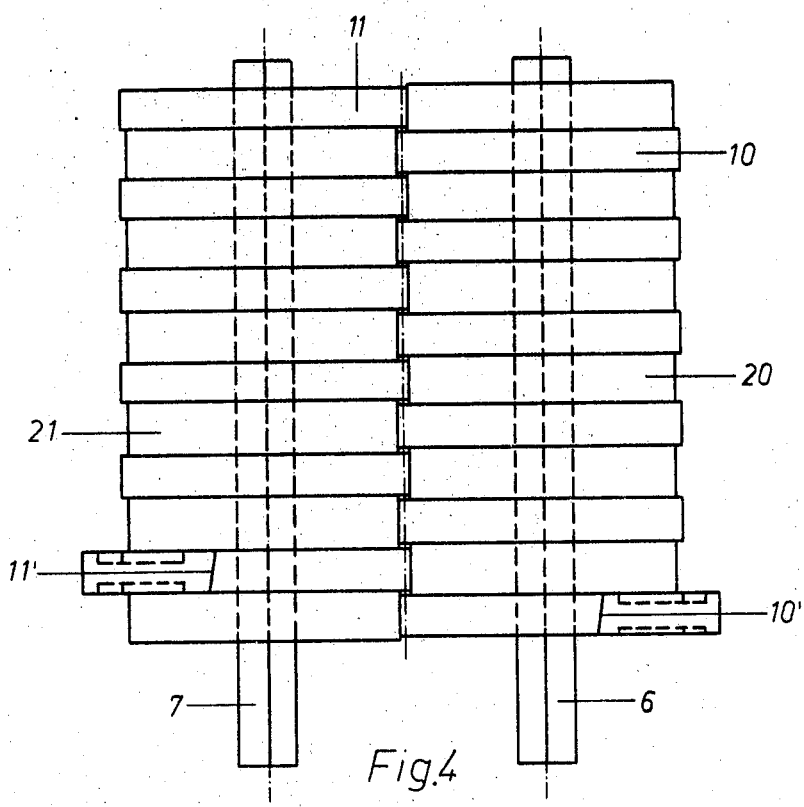
Figure 5:
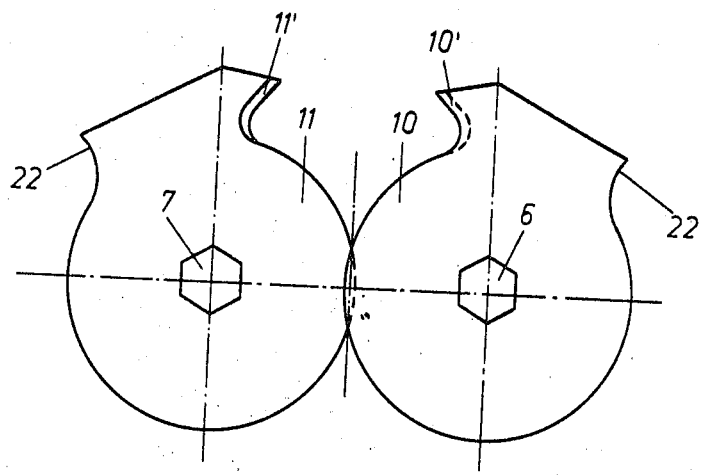
Figure 6:
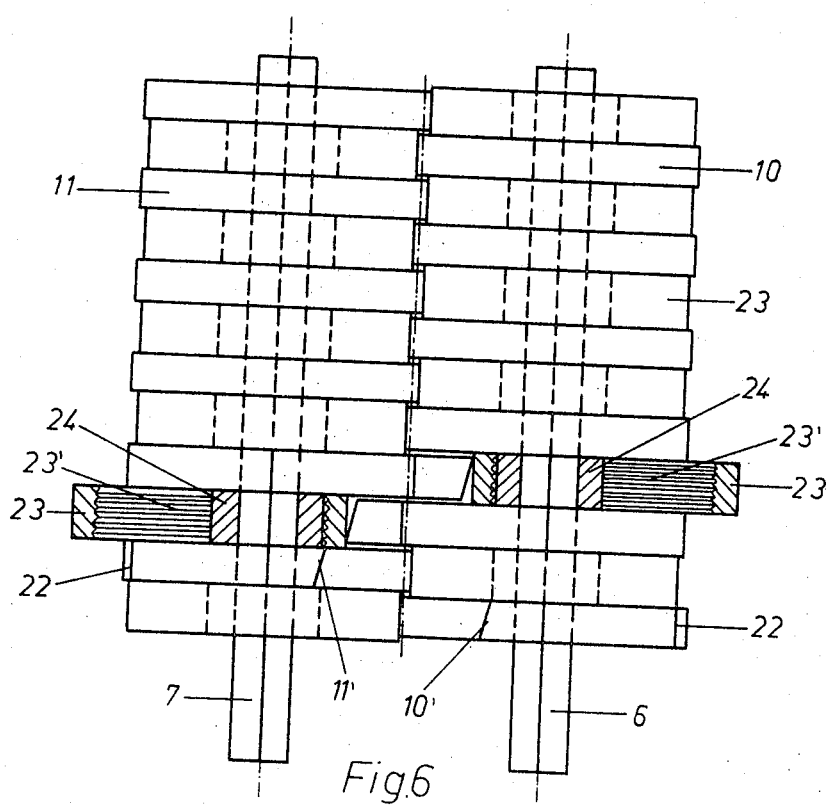
Figure 7:
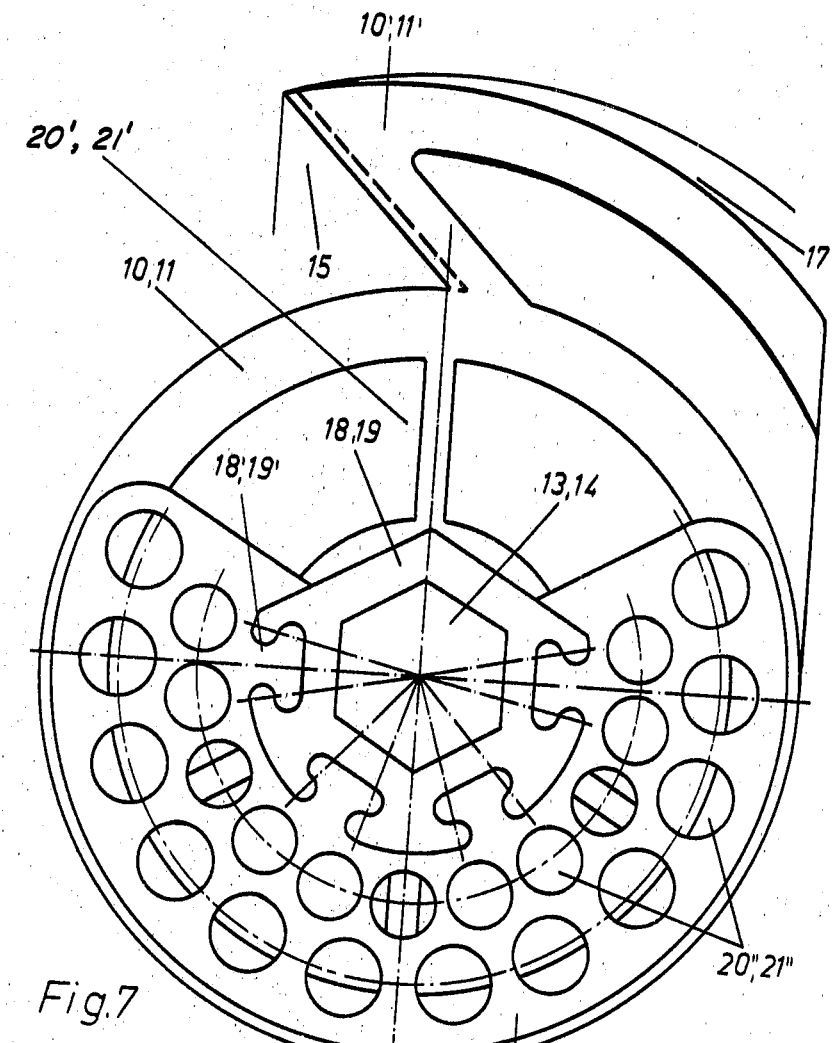
Figure 8:
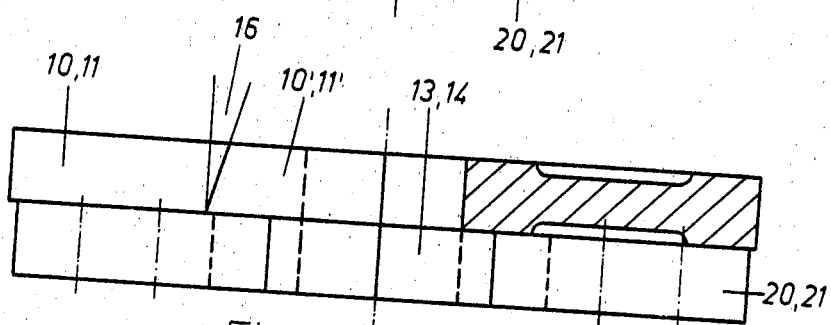

The following specification will serve the explanation of the object of the invention, two implementation examples being illustrated in the drawings, which show:

FIG. 1 a machine for granulating bulk rubbish or bulky refuse, in section;

FIG. 2 another design according to FIG. 1;

FIG. 3 an enlarged view of the two juxtaposed shafts with knife blades attached, in side view according to FIG. 1;

FIG. 4 a top view of FIG. 3;

FIG. 5 another design of the knife blades according to FIG. 2;

FIG. 6 a top view according to FIG. 5;

FIG. 7 a knife blade with tangentially attached piercing-cutting tooth in side view, the knife blade displaying on the flange a circular segment consisting of an elastic material;

FIG. 8 a top view of the knife blade with piercing-cutting tooth and attached circular segment according to FIG. 7.

As may be seen from FIGS. 1 and 2, the machine for granulating bulk rubbish or bulky refuse has a housing 1. The housing has a filler opening 2 in the form of a hollow shaft or tubular inlet, adjoined by and communicating with a trough 3. Housing 1 is equipped with feet 4 or the like, known as such. The length of feet 4 or the like is such that either a stationary or mobile collecting container 5 of various sizes to receive the granulated material can be placed under housing 1 between the feet 4.

Disposed in trough 3 are two juxtaposed shafts 6, 7 which are mutually spaced and driven in opposing directions by an electric motor. The shafts 6, 7 and motor may be interconnected in various ways, such as by a sprocket chain or also by a gear drive. But attention must be paid that the shafts 6, 7 are driven at a slow speed only, otherwise a reduction gear must be interposed between electric motor and shafts 6, 7. Shafts 6, 7 rotate either in synchronism or at different speeds. Knife blades 10, 11 are mounted on shafts 6, 7 so as to be juxtaposed, mutually spaced and staggered with respect to each other. The number of the mutually spaced knife blade 10 or 11 may be random. The distance between the various knife blades is greater by approximately 250 to 1000 microns than the width (thickness) of the knife blades 10, 11. The width of the knife blades 10, 11 is uniform. Each of the knife blades 10, 11 has one single piercing-cutting tooth 10', 11', arranged tangentially on the knife blade 10, 11. The height of the piercing tooth 10', 11' corresponds to approximately one third the diameter of the knife blade 10, 11. However, the piercing-cutting teeth 10', 11' of knife blades 10, 11 must be so designed that they can clear without interference as they rotate on shafts 6, 7 in opposing directions.

According to FIGS. 2, 5, and 6, the knife blades 10, 11 disposed on shafts 6, 7 are of solid design and have a filleted or bevelled piercing-cutting tooth 10', 11' which goes over into a rear back tooth 22. Disposed between the various knife blades 10, 11 are spacers 24, with a radially movable cleaning ring 23 over them. The back tooth 22 and the radially movable cleaning ring 23 provide the assurance that no granulated material can collect between the various knife blades 10, 11. After the piercing-cutting tooth 10', 11' has passed the free space between two knife blades 10, 11, the back tooth 22 combs this free space, removing, in cooperation with the cleaning ring 23, the granulated material therefrom.

So that no granulated material will lodge between the cleaning ring 23 and the spacer 24, the latter has an external thread and the cleaning ring 23 a smooth inside diameter. But the possibility also exists, as the illustrated example (see FIG. 6) demonstrates, to equip the cleaning ring 23 with an internal thread 23'. In that case, the outside diameter of the spacer 24 is smooth. The material located in that area is transported outward and into container 5 through the free space resulting from the thread between spacer 24 and cleaning ring 23.

The possibility also exists to equip only the slower rotating shaft with the cleaning ring 23, because the granulated material cannot jam in the free space between the knife blades 10 or 11 due to the centrifugal force developed by the faster rotating shaft. However, this is merely an exemplary design, which is ultimately left to the specialist.

The trough 3 in the machine housing 1 encloses the knife blades 10, 11 at the bottom and the sides thereof. On the bottom side 3', the trough 3 is equipped with a replaceable screen 12 forming an outlet means for the housing 3 (FIG. 1).

Instead of screen 12, the machine according to FIG. 2 has a discharge shaft 3″ with rods 3‴ extending downward. The rods 3‴, made of metal, plastic or the like, are mutually spaced in lines and in columns and thus prevent access to trough 3 and, consequently, to the working area of the knife blades 10, 11.

The shafts 6, 7 which may have any desired number of knife blades 10, 11 are disposed so as to be running parallel to and spaced from each other. The mutual spacing of shafts 6, 7 is slightly smaller than the diameter of the knife blades 10 or 11. The knife blades 10, 11 are mutually spaced on shaft 6, 7 in accordance with the thickness of the opposite knife blade so that the piercing-cutting tooth 10', 11' engages the free space between two knife blades 10, 11, traversing it during the work cycle.

The knife blades 10, 11 have an opening 13, 14 and are exchangeably mounted, for example, on the hexagonal shaft 6, 7 by means of thread and counternut.

The piercing-cutting tooth 10', 11', running tangential to the knife blade 10, 11, is of strong design and has a hardened cutting edge. The cutting angle 15 is between 45 and 80°, while the rake angle 16 amounts to between 0 and 45°. The clearance angle 17 is approximately 10°. It is pointed out that the cutting edge has the same width as the entire piercing-cutting tooth 10', 11' and, consequently, of the knife blade 10, 11.

In the area of their bores 13, 14 for the shafts 6, 7, the knife blades 10, 11 according to FIGS. 1, 3 and 4 have a flange-like extension 18 or 19, as shown most clearly in FIGS. 7 and 8 whose periphery has recesses 18' or 19'. The thickness of the flange-like extension 18 or 19 is slightly greater than the width of the respective knife blade 10, 11. To each flange 18, 19 there is attached a separate circular segment 20, 21, consisting of an elastic material, in such a manner that it, 20, 21 in the area of tooth 10', 11', has a recess 20', 21' of an approximately 90° angle. This recess 20', 21' is necessary for the piercing-cutting teeth 10, 11' to be able to rotate freely and without making contact with the segment 20, 21 as they rotate with the knife blades 10, 11. The diameter of the various circular segments 20, 21 is so selected that the knife blades 10, 11 rest against the circular segments 20, 21 with a certain pressure while rotating. This originates a certain kneading action at the elastic circular segments 20, 21 which, however, is insignificant. The circular segments 20, 21 have openings 20'', 21'' in the form of bores or the like. The knive blades according to FIGS. 5 and 6 have no flange extensions and are solid.

The various knife blades 10 or 11 with their respective tangentially disposed piercing-cutting tooth 10', 11' on their respective shaft 6 or 7 are so arranged that the piercing-cutting teeth 10', 11' are evenly staggered, are distributed over the circumference of the shaft 6, 7 and get to engage the respective knife blade 10 or 11 of the opposite shaft 6 or 7 evenly.

The operating mode of the machine for granulating bulk rubbish or bulky refuse of any kind is such that the material, when placed in the shaft-like filler opening 2, is grabbed by the respective two piercing-cutting teeth 10', 11' of the two knife blades 10, 11. Then the piercing-cutting teeth 10', 11' pierce the material. As the knife blades 10, 11 with the piercing-cutting teeth 10', 11' rotate, the material is pulled down and compressed, during which operation the cutting edges of the piercing-cutting teeth 10', 11' become effective. The material charged is sheared off by means of the cutting edges of the piercing-cutting teeth 10', 11', the latter cutting the material into short strips. These strips are caught by the adjustable screen 12 which closes off trough 3, or by the discharge shaft 3'', and are again gripped by or impaled on the piercing-cutting teeth 10', 11' of the knife blades 10, 11, brought upward and caused to go through the cutting operation until the material has been comminuted to a size small enough to pass through the openings of screen 12 or the spaces between discharge shafts 3'', falling in the form of ground waste into the catch receptacle 5. The bulky material granulated to refuse has, in cut-up condition, a volume from 1/10 to 1/20 of its original, bulky condition.

Thus, it will be seen that with the structure of the invention there are a pair of shafts 6 and 7 which are adapted to rotate in opposite directions and each of which carries a series of rotary cutters, the rotary cutters 10 being fixed to and distributed along the shaft 6 while the rotary cutters 11 are fixed to and distributed along the shaft 7. These cutters are spaced from each other along each shaft by a distance greater than the thickness of the cutters, and moreover the several cutters on one shaft are lined with the spaces between the cutters on the other shaft. Each cutter has a circular portion fixed to and surrounding the shaft on which it is mounted and a cutting tooth projecting from the periphery of the circular portion, and the peripheries of these circular portions are arranged closely adjacent to each other, actually in slightly overlapping relation, so that the cutting teeth of the cutters on one shaft will pass through the spaces between the cutters on the other shaft. These cutters on each shaft are of course arranged in angularly staggered relationship as described above. Moreover, each cutter has only one cutting tooth. The trough 3 forms a housing for accommodating the pair of rotary shafts with the cutters thereon, and this housing has the tubular inlet 2 which feeds the material to be comminuted down to the rotary cutters. Beneath these cutters the housing 3 has an outlet means situated closely adjacent to the space through which the teeth turn and having a means for preventing comminuted material from falling through the outlet means until the comminuted material has been comminuted down to a given size, so that the rotary cutting teeth will function not only to comminute the material but also to repeatedly raise the material away from the outlet means and repeatedly comminute the material until it has been reduced to the size required for falling through the outlet means to be received in the receptacle 5. The structure 23, 24 in the embodiment of FIGS. 2, 5 and 6 and the structure shown in FIGS. 7 and 8, which is adapted to be used with the embodiment of FIGS. 1, 3, and 4 forms a means carried by each of the shafts for contacting with the rotary cutters for cleaning the spaces between the cutters during operating of the machine.

What is claimed is:

1. In a machine for comminuting bulky refuse, a pair of elongated parallel substantially horizontal shafts adapted to rotate in opposite directions, a plurality of cutters carried by and distributed along each shaft for rotation therewith, said cutters having a uniform thickness and being spaced from each other along each shaft by distances slightly greater than said thickness, each cutter having a circular portion surrounding the shaft on which it is mounted and a single cutting tooth projecting from the periphery of said circular portion, the cutters on one shaft being respectively aligned with the spaces between the cutters on the other shaft, and said shafts being situated from each other by a distance which locates the peripheries of said circular portions of the cutters on said shaft closely adjacent to each other so that the cutting teeth of the cutters on one shaft pass through the spaces between the cutters on the other shaft, a housing of substantially trough-shaped configuration accommodating said shafts and cutters in the interior of said housing, the latter carrying an upper inlet through which material is supplied to the rotary shafts and cutters thereon and said housing having adjacent to the space through which the teeth rotate a lower outlet having a means which prevents comminuted material from passing downwardly through said outlet until the material has been comminuted down to a given size, said teeth functioning not only to comminute the material but also to raise the material from said outlet and repeatedly comminute the material until it has been reduced to the size required for passing through said outlet, and means carried by said shafts in the spaces between said cutters thereon for coacting with the rotary cutters for cleaning refuse out of the spaces between said cutters.

2. The combination of claim 1 and wherein each of said cutting teeth has a leading cutting tooth portion and a trailing tooth portion.

3. The combination of claim 1 and wherein each of said cutting teeth has a leading cutting tooth portion extending tangentially to the circular portion of each cutter and having a cutting angle of between 45° and 80°, a rake angle of between 45° and 90°, and a clearance angle of approximately 10°.

4. The combination of claim 2 and wherein said cleaning means between each pair of cutters includes a spacer ring fixed to the shaft between each pair of cutters and an outer ring surrounding and radially movable with respect to said spacer ring, said outer ring having an inner surface directed toward said spacer ring and said spacer ring having an outer surface directed toward said outer ring, and one of said surfaces being formed with threads, the outer ring in the space between each pair of successive cutters on one shaft being situated close enough to the tooth of a cutter aligned with the space which accommodates said outer ring to be displaced by the tooth which enters into said space for bringing about a cleaning action in each space.

5. The combination of claim 1 and wherein the cleaning means located in the space between each pair of successive cutters on each shaft includes an elastic circular segment fixed to each cutter and extending therefrom into the space between each cutter and the next cutter, said elastic segment having a radius great enough to be engaged by the circular portion of the cutter which enters into the space in which said elastic segment is located, and said segment being formed with a peripheral notch great enough to receive the cutting tooth of the cutter which enters the space in which the circular segment is located and receiving the latter tooth so that the elastic segment is not damaged by the tooth which enters the space in which the leastic segment is located.

6. The combination of claim 1 and wherein said means at said outlet for preventing passage of comminuted material greater than a given size includes a sieve having openings which determine the size down to which the material must be comminuted before passing through said outlet.

7. The combination of claim 1 and wherein said means at said outlet for preventing passage of material until the latter has been comminuted down to said given size includes a plurality of vertically extending rods spaced from each other by distances which determine the size down to which the material must be comminuted before passing downwardly through the spaces between said rods.

References Cited

UNITED STATES PATENTS 2,753,908  7/1956  Anderson  _____ 241—236 X

FOREIGN PATENTS 607,640  9/1960  Italy  _____ 241—236

ANDREW R. JUHASZ, Primary Examiner

M. KOCZO, Jr., Assistant Examiner

U.S. Cl. X.R.

241—190, 191